US008064181B2

(12) United States Patent
Klaube

(10) Patent No.: US 8,064,181 B2
(45) Date of Patent: Nov. 22, 2011

(54) SURGE ARRESTER WITH A CAGE DESIGN

(75) Inventor: Hartmut Klaube, Hermdorf (DE)

(73) Assignee: Tridelta Uberspannungsableiter GmbH (DE)

( * ) Notice: Subject to any disclaimer, the term of this patent is extended or adjusted under 35 U.S.C. 154(b) by 190 days.

(21) Appl. No.: 12/162,073

(22) PCT Filed: Dec. 11, 2006

(86) PCT No.: PCT/EP2006/069532
§ 371 (c)(1),
(2), (4) Date: May 19, 2009

(87) PCT Pub. No.: WO2007/085325
PCT Pub. Date: Aug. 2, 2007

(65) Prior Publication Data

US 2009/0225487 A1 Sep. 10, 2009

(30) Foreign Application Priority Data

Jan. 25, 2006 (DE) ......................... 10 2006 003 576

(51) Int. Cl.
*H02H 1/00* (2006.01)

(52) U.S. Cl. ....................................... 361/117; 361/127

(58) Field of Classification Search .......... 361/117–120, 361/127
See application file for complete search history.

(56) References Cited

U.S. PATENT DOCUMENTS 4,962,440 A * 10/1990 Johnnerfelt et al. .......... 361/126
5,363,266 A * 11/1994 Wiseman et al. ............. 361/127
5,402,100 A * 3/1995 Urbanek et al. ................ 338/21
6,777,614 B1 8/2004 Suenwoldt

FOREIGN PATENT DOCUMENTS

DE 199 40 939 7/2001
JP 2002175905 6/2002

OTHER PUBLICATIONS

International Search Report in corresponding PCT/EP2006/069532dated Mar. 28, 2007.
Written Opinion in corresponding PCT/EP2006/069532.
International Preliminary Report of Patentability in corresponding PCT/EP2006/0695326 dated Sep. 9, 2008.

* cited by examiner

*Primary Examiner* — Danny Nguyen
(74) *Attorney, Agent, or Firm* — McCracken & Frank LLP

(57) ABSTRACT

The invention relates to a surge arrester having at least one varistor block; two end fittings; one reinforcing element which holds the varistor block under tension at the end fittings and at least one anchoring element, which holds the reinforcing element in a hole through at least one of the end fittings. The reinforcing element is preferable a wedge which splits the reinforcing element and braces with the outer walls of the through-hole. Alternatively, two or more glass-fiber-reinforced reinforcing elements are held in a through-hole, and a wedge between these reinforcing elements ensures that the reinforcing elements are held with a force fit in the end fitting in the area of the through-hole.

18 Claims, 3 Drawing Sheets

SURGE ARRESTER WITH A CAGE DESIGN

The invention relates to a surge arrester with a cage design, as is known by way of example from JP 62-149511 (application number). In power supply systems, surge arresters are connected between live lines and earth in order to dissipate any overvoltage on the line to earth, and thus to protect other components in the electrical grid system. A surge arrester such as this contains a stack of varistor blocks, which is connected between two connecting elements or end fittings. This arrangement is accommodated in a housing.

In order to ensure that the varistor blocks make good contact with one another even when subject to mechanical loads, it is necessary to hold the stack together under pressure. In the case of surge arresters with a cage design, this is done by means of reinforcing elements, in general rods or cables, preferably glass-fibre-reinforced plastic rods (GFC rods) which are held under tension at the two end fittings.

One problem with surge arresters such as these is to attach the reinforcing elements securely to the end fittings so as to achieve the necessary strength even in the event of the mechanical loads which occur when surge arresters are installed in the open air.

In the cited Japanese patent application, this problem is solved by providing grooves in the stacking direction of the varistor blocks in the end fittings, into which the reinforcing elements are inserted, and by equipping the end of the reinforcing elements with a thread onto which a nut is screwed whose diameter is larger than the groove in the end fitting, thus holding the reinforcing element—essentially by means of an interlock.

Although a surge arrester can be designed effectively in this way, there is a problem in cutting the thread into the GFC rods that are used as reinforcing elements, without damaging them. This is highly complex and expensive.

European Patent EP 93 915 343.3 discloses further possible ways to allow reinforcing elements to be anchored on the end fittings of a surge arrester. In particular, this document proposes that the reinforcing elements be fixed by means of a pin or a screw which extends at right angles to the longitudinal direction of the reinforcing elements and is passed through a hole through the rods. The pin and the screw are then held in a corresponding recess or a threaded hole in the fitting.

Although it is considerably simpler to make a hole in the direction at right angles to the direction in which the GFC rods that are used as glass-reinforcing elements extend than to cut a thread in them, this design involves the risk of the reinforcing elements being weakened in the area of the hole, such that they tear.

The cited European patent furthermore also discloses the capability to fix the reinforcing elements in the end fitting by means of wedges. For this purpose, a wedge which runs in the direction of the stack centre of the varistor blocks is positioned between each reinforcing element and a correspondingly inclined surface of the end fitting, and the two are held together, subject to radial pressure, by an outer part of the end fitting. When tensile loads are applied to the reinforcing elements, the wedges are drawn together by static friction and ensure that the reinforcing elements are held with a friction lock or force lock between the associated wedge and the end fitting.

In this proposed surge arrester, the reinforcing elements are preferably thin strips, with cross sections in the form of circle segments, composed of glass-fibre-reinforced plastic material, to be precise in such a manner that the curvature of the glass-fibre-reinforced reinforcing element corresponds to the radius of curvature of the varistor blocks.

This design leads to difficulties when the insulating housing is formed by casting or extrusion-coating, since it is easy for cavities to remain between the glass-fibre-reinforced plastic element and the varistor blocks. Partial discharges can occur in cavities such as these, associated with the risk of damage to the insulation when continuously loaded by additional heating and by erosion flashover channels which develop from the partial discharge point.

Furthermore, glass-fibre-reinforced reinforcing elements formed in this way are complex and expensive to manufacture.

The object of the present invention is to provide a surge arrester with a cage design, which avoids the abovementioned disadvantages and is suitable for low-cost mass production.

According to the invention, the object is achieved by a surge arrester according to Claim 1 or 2. The dependent claims relate to further advantageous aspects of the invention.

The invention will be described in detail in the following text with reference to the attached drawings, in which.

Figure 1:
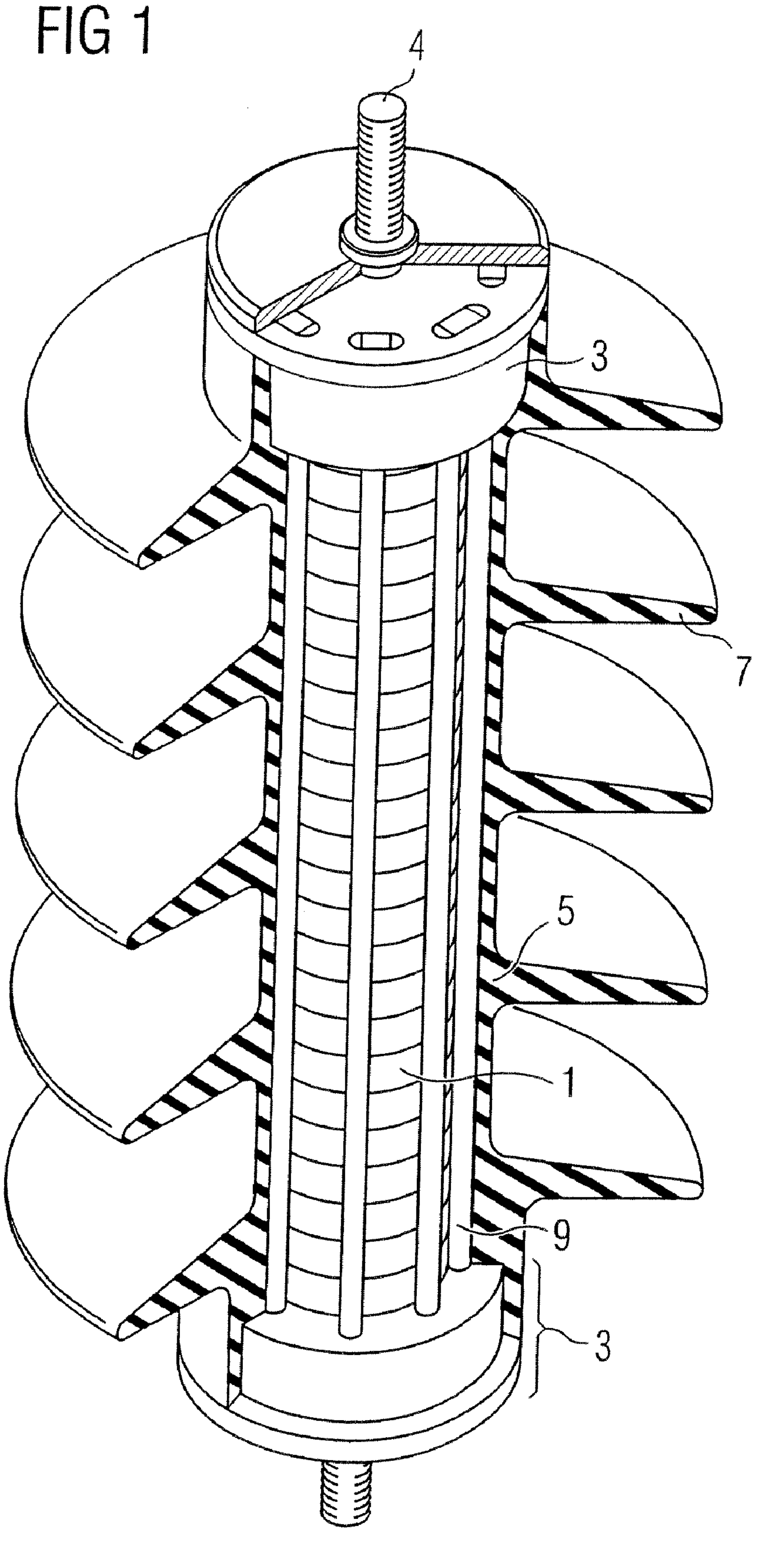
FIG. 1 shows an overall view of a surge arrester of this generic type, with the outer housing partially cut away.

The surge arrester with a cage design as shown in FIG. 1 contains at least one varistor block 1. Known ceramic discs with a voltage-dependent resistance (variable resistor) are used as varistor blocks 1. At low voltages, they operate virtually as perfect isolators, while they have good conductivity at high voltage. Commercially available varistor blocks are produced on the basis of zinc oxide (ZnO). However, the invention is not restricted to zinc-oxide surge arresters such as these, and other metal oxides as well as silicon carbide, for example, can also be used for the varistor blocks. Furthermore, in addition to varistor blocks 1, the stack may also contain further blocks, such as metal blocks or spark-gap blocks, in order in this way to match the length of the surge arrester to the requirements of the respective purpose.

Commercially available varistor blocks 1 are in the form of circular cylinders with a diameter of, for example 5 cm and a height of about 4 cm. Aluminium electrodes, which are not shown in detail, are fitted on both sides of the varistor blocks 1 in order to ensure better contact. It is also normal to place thin aluminium discs or else spring elements, which are likewise not shown, between the varistor blocks 1 in order to further improve the contact.

A stack formed by stacking varistor blocks 1 such as these and possibly metal blocks one on top of the other is held between two end fittings 3, in the surge arrester as shown in FIG. 1. The end fittings are normally formed from aluminium or stainless steel and are designed in such a manner that they can easily be included in existing electrical installations or power supply grid systems, for example by means of a central screw 4, which projects out of the surge arrester and makes good electrical contact with the varistor blocks 1.

For protection against the environment, these surge arresters are surrounded by an outer housing 5, often composed of silicone. The housing can be formed by spraying or casting.

Screens 7 are formed on the outside of the housing 5, in order to lengthen the creepage path for the current.

When they are used in an outdoor environment, surge arresters are subject to considerable bending moments as a result of the forces which are transmitted through the electrical lines that are connected to them. It is therefore necessary to ensure that, even when subjected to relatively major mechanical loads, the contact between the varistor blocks 1 and of the end fittings is maintained, and that fracture of the edges of the varistor blocks as a result of tilting between two adjacent varistor blocks is avoided. In order to achieve this, glass-fibre-reinforced plastic rods or cables 9 are clamped in between the two end fittings 3, as reinforcing elements. These hold the varistor blocks 1 together between the two end fittings 3, with a tensile load. Furthermore, spring elements are also occasionally inserted into the stack of varistor blocks 1 in order in this way to ensure contact even in the event of temperature fluctuations or the like.

In the following text, the anchoring elements are referred to as rods 9, without this being intended to form any restriction to the invention.

Figure 2:
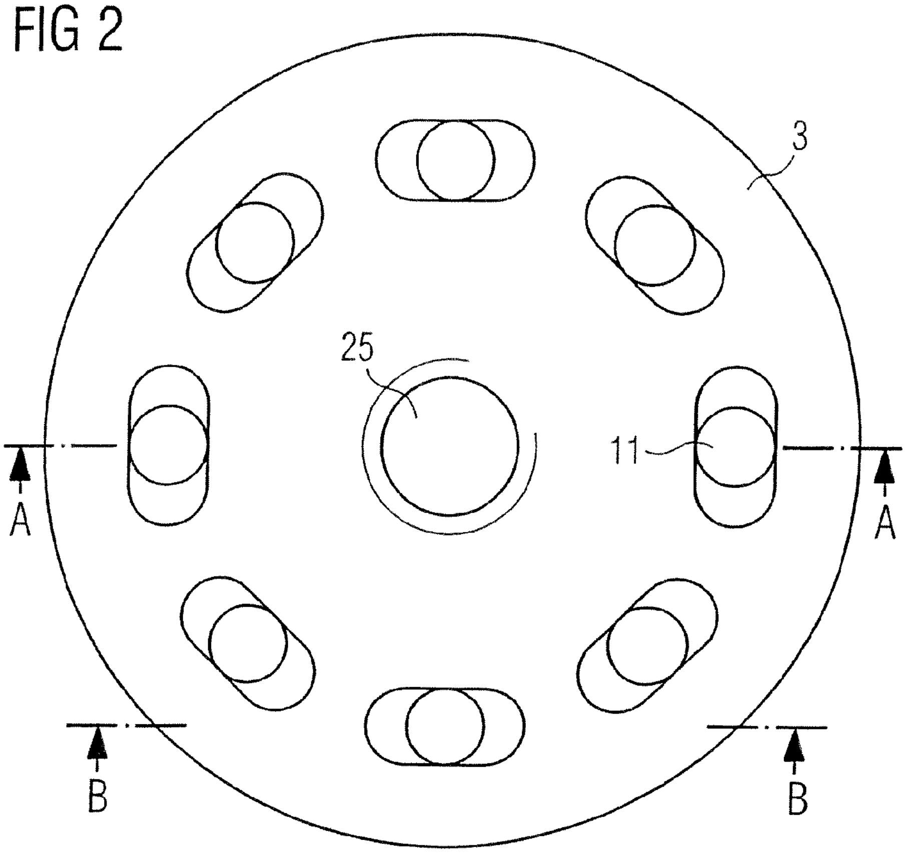
FIG. 2 shows a plan view of the end fitting of the surge arrester according to the invention.

FIG. 2 shows a plan view of an end fitting of a surge arrester according to the invention. The end fitting 3 is essentially in the form of a circular-cylindrical block, whose diameter is greater than that of the varistor blocks. Through-holes 11 which run along the circumference of the end fitting in the stacking direction are formed in the radial area of the end fitting, projecting beyond the varistor blocks. A further through-hole 25 for the central screw 4, preferably with an internal thread, is formed in the centre of the end fitting.

At least in one subsection, the cross-sections of the through-holes 11 are not circular, and are preferably widened in the tangential direction on the side of the end fitting facing away from the varistor blocks.

The illustrated embodiment shows eight through-holes, although any other number is also possible, for example three or four through-holes 11.

Figure 3:
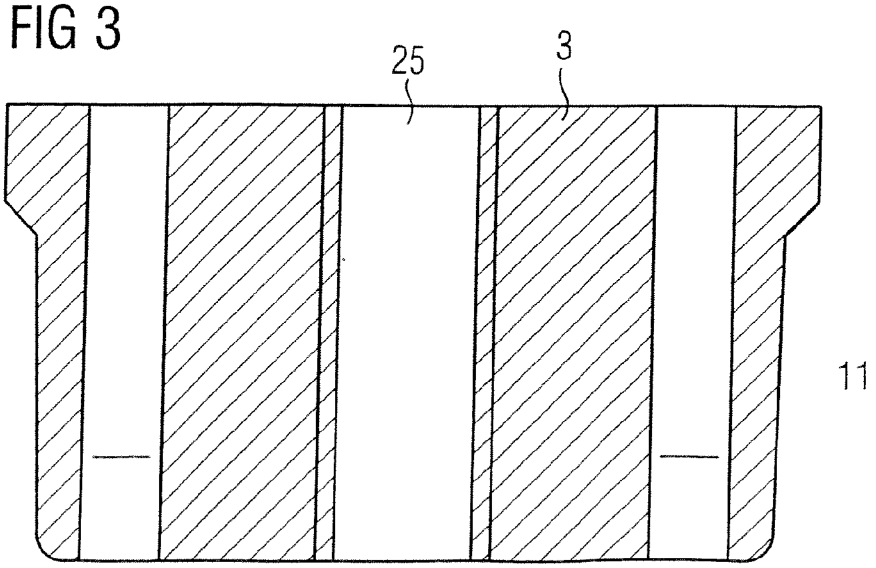
FIG. 3 shows a section view along the line A-A in FIG. 2.

FIG. 3 shows a cross section through an end fitting 3 along the line A-A in FIG. 2.

Figure 4:
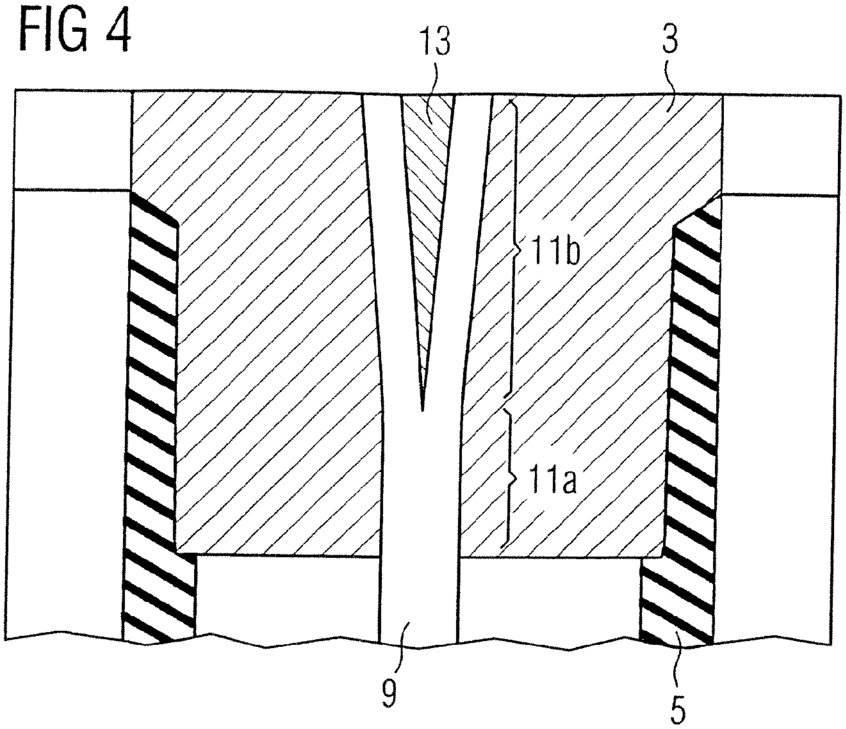
FIG. 4 shows a section view along the line B-B from FIG. 2 with a wedge inserted.

FIG. 4 shows a detailed view of a through-hole 11 such as this, in a section view along the line B-B from FIG. 2.

As can be seen here, the through-hole 11 has a first conical section 11*b* and a second section 11*a* which runs in a straight line. The shape of the straight section 11*a* is designed to match the glass-fibre-reinforced rod 9, in order to surround it with an accurate fit. The through-hole preferably has a circular cross section in the area of the second section.

The first section 11*b* is widened conically in one direction. An angle of about 5° is preferred as the inclination angle of the conical surfaces.

As is shown in FIG. 4, a glass-fibre-reinforced plastic rod 9 is held in the through-hole 11 and a wedge 13 is driven into the rod 9, in order to split it.

A plurality of glass-fibre-reinforced plastic rods are attached in this way to the end fitting 3 on both sides of the varistor block stack with the wedges 13, along the circumference of the varistor blocks.

In order to make it easier to insert the wedges, it is possible to provide the glass-fibre-reinforced rods with a notch on their end surfaces, into which the wedges are driven during production.

The design according to the invention of the end fittings 3 with their through-holes 11 and the conical section 11*b* in conjunction with the wedge 13 and the glass-fibre-reinforced rods 9 results in the two halves of the glass-fibre-reinforced rod 9 being pressed firmly against the obliquely running sidewalls of the conical section 11*d* in the area in which this rod 9 is split. This wedge connection is made ever tighter by applying a tensile load to the glass-fibre-reinforced plastic rods 9, with the glass-fibre-reinforced rod being held with a force fit in the hole 11 through the end fitting 3. Trials have shown that this allows the glass-fibre-reinforced rods 9 to be mounted in the end fittings 3 in a manner which ensures that they are held securely until the glass-fibre-reinforced rods 9 reach their breaking point.

In order to enhance the connection between the wedge 13 and the glass-fibre-reinforced rods 9, it is possible to form cutting edges on the wedge surfaces of the wedge 13 at right angles to the rod direction of the glass-fibre-reinforced plastic rod 9, cutting into the glass-fibre-reinforced rod 9 when loaded.

In order to protect the wedge connection and the entire surge arrester against moisture, it is possible to seal the through-hole 11 with a silicone compound after insertion of the rods and the wedges.

During production, an end fitting 3 is first of all provided with glass-fibre-reinforced rods 9 and the wedges 13 are inserted. The varistor blocks 1 are inserted from the open side into the "cage" that is formed in this way, during which process care must be taken to ensure that the varistor blocks are arranged centrally and that a constant distance is maintained between their outer surfaces and the glass-fibre-reinforced plastic rods 9. One or more cup springs can be inserted into the stack of varistor blocks. In the same way, shims and aluminium blocks can be used to match the length of the stack as appropriate to the planned purpose.

Once the varistor discs and the cup springs have been inserted, the second end fitting 3 is fitted, with the glass-fibre-reinforced rods 9 being passed through the appropriate through-holes 11. With the entire stack being pressed together by external force, the wedges 13 are then driven into the rods, and the screws 4 are introduced through the end fittings 3 in order to make contact with the varistor blocks 1.

The cage formed in this way with the varistor blocks 1 accommodated in it is placed in a mould and is extrusion-coated or sprayed with a low-viscosity silicone in order to form the outer housing 5, if appropriate with the screens 7. As shown, the glass-fibre-reinforced rods according to the invention preferably have a circular cross section. This means that the rods 9 can be surrounded relatively easily and completely with the low-viscosity silicone, and that the low-viscosity silicone also penetrates completely into the space between the glass-fibre-reinforced rods 9 and the outer surface of the varistor blocks 1. In comparison with the cross section in the form of circle segments from the prior art, the circular cross section offers the major advantage that there is only a very small area in which the distance between the rods 9 and the varistor blocks 1 is minimal. This small area can be filled without any problems with the aid of the conventional low-viscosity silicones and known spraying and casting techniques.

Glass-fibre-reinforced plastic rods 9 with a circular cross section are commercially available, and cost little to manufacture.

Figure 5:
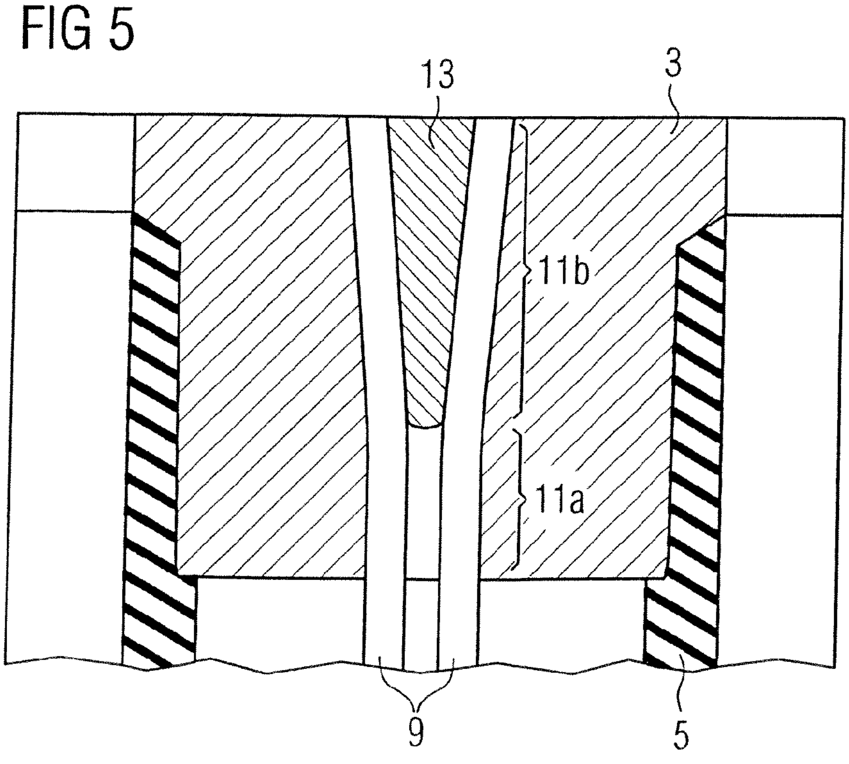
FIG. 5 shows a section view along the line B-B from FIG. 2 with a wedge inserted, according to a second embodiment.

FIG. 5 shows a second embodiment according to the invention. In this embodiment, the through-hole 11 has an oval cross section all the way through it. However, the splitting of the through-hole 11 into a straight section 11*a* and a conical section 11*b* is retained. The two sections 11*a* and 11*b* of the through-hole in this embodiment differ only in the size of the major axis of the oval.

According to the second embodiment, two semicircular glass-fibre-reinforced plastic rods 9 are inserted into each through-hole 11. A gap remains over the entire length of the surge arrester between two rods 9 in one through-hole. The size of this gap may be about 5 mm, although larger or smaller gap widths are also possible.

Glass-fibre-reinforced rods 9 such as these with a semicircular cross section can be formed relatively easily by drawing, by choice of a suitable tool for the production of the rods. According to the invention, in this embodiment, the rods 9 and the associated wedge 13 are arranged such that the gap between the two rods 9 in one through-hole 11 runs radially with respect to the stack of varistor blocks 1.

This has the advantage that, during the construction of the outer housing, the low-viscosity silicone can penetrate better and more effectively into the space between the rods 9 and the varistor blocks 1.

As in the case of the first embodiment, it is also possible in the case of this embodiment to provide the wedge 13 with corresponding cutting edges, in order to increase the connection force between the wedge 13 and the glass-fibre-reinforced rods 9.

Once again, tests with this embodiment have shown that the wedge connection of the glass-fibre-reinforced plastic rods 9 to the end fitting 3 is maintained to the breaking point of the glass-fibre-reinforced rods 9. The construction in the form of two semicircular glass-fibre-reinforced plastic rods 9 in advance, in comparison to splitting a single rod 9 with a wedge according to the first embodiment, offers the advantage that this makes it possible to avoid damage to the rods 9.

Although the preferred embodiments of the invention have been described above, the invention is not restricted to these embodiments. In particular, there is no need to secure the glass-fibre-reinforced plastic rods 9 in the two end fittings 3 in the same manner. For example, instead of glass-fibre-reinforced rods 9, it would also be possible to use “cables”, in which case these are guided over a shoulder in one of the end fittings for anchoring purposes, and are attached to the anchoring elements according to the invention only in the opposite end fitting.

The invention claimed is:

1. A surge arrester having:

at least one varistor block;

two end fitting, which are arranged on opposite sides of the varistor block;

at least one reinforcing element which holds the varistor block and the end fittings together;

at least one anchoring element, which holds the reinforcing element in a through-hole through at least one of the end fittings;

characterized in that the anchoring element is a wedge which splits the reinforcing element in its longitudinal direction and braces it against the other walls of the through-hole.

2. A surge arrester having:

at least one varistor block; two end fittings, which are arranged on opposite sides of the varistor block;

at least two reinforcing elements which hold the varistor block and the end fittings together;

at least one anchoring element, which holds the reinforcing element in a through-hole through at least one of the end fittings;

characterized in that at least two reinforcing elements are held in the through-hole through one end fitting, with the anchoring element being a single wedge which braces against each of the reinforcing elements in the through-hole and presses the reinforcing elements against the outer walls of the through-hole.

3. Surge arrester according to claim 1, characterized that the varistor block or blocks is or are formed from a metal oxide, preferably from zinc oxide.

4. Surge arrester according to claim 1, characterized in that the end fittings are formed from a metal, preferably from aluminum.

5. Surge arrester according to claim 1, characterized in that the surge arrester has a housing with screens.

6. Surge arrester according to claim 1, characterized in that the outer housing is formed by spraying or casting with a low-viscosity silicone.

7. Surge arrester according to claim 2, characterized in that a gap is provided between the two glass-fibre-reinforced reinforcing elements of a through-hole over the entire length of the surge arrester.

8. A surge arrester, comprising:

a varistor block disposed between a first end fitting and a second end fitting, the first and second end fittings arranged on opposite ends of the varistor block, wherein the first end fitting comprises a body having a plurality of through-boreholes spaced apart from each other, each through-borehole comprising a bore extending entirely through the body;

a reinforcing element that holds the varistor block and the first and second end fittings together, wherein the reinforcing element extends through a first one of the through-boreholes in the first end fitting; and and an anchoring element that holds the reinforcing element in the first through-borehole, wherein the anchoring element has a wedge shape and is inserted into a central area of an end of the reinforcing element in the first through-borehole, wherein the anchoring element presses the reinforcing element outwardly firmly against a circumferential wall of the first through-borehole.

9. The surge arrester of claim 8, wherein the reinforcing element is a solid cylindrical member.

10. The surge arrester of claim 9, wherein the reinforcing element is a rod.

11. The surge arrester of claim 10, wherein the reinforcing element comprises a glass-reinforced-plastic.

12. The surge arrester of claim 9, wherein the reinforcing element is a cable.

13. The surge arrester of claim 8, wherein the anchoring element splits the reinforcing element apart in its longitudinal direction.

14. The surge arrester of claim 13, wherein the first through-borehole comprises a cylindrical section and a conical section extending from the cylindrical section toward a surface of the body opposite the varistor block.

15. The surge arrester of claim 14, wherein the conical section has an oval cross-sectional shape.

16. The surge arrester of claim 15, wherein the cylindrical section has a circular cross-sectional shape.

17. The surge arrester of claim 15, wherein the cylindrical section has an oval cross-sectional shape.

18. The surge arrester of claim 8, wherein the varistor block comprises one of a stack of a plurality of varistor blocks disposed between the first end fitting and the second end fitting.

* * * * *